Dec. 7, 1965  R. L. SHELLHAUSE  3,221,502
FLOW CONTROL MASTER CYLINDER
Filed March 23, 1964 2 Sheets-Sheet 1

INVENTOR.
RONALD L. SHELLHAUSE
BY
D. D. McGraw
HIS ATTORNEY

Dec. 7, 1965  R. L. SHELLHAUSE  3,221,502
FLOW CONTROL MASTER CYLINDER
Filed March 23, 1964  2 Sheets-Sheet 2

INVENTOR.
RONALD L. SHELLHAUSE
BY
D. D. McGraw
HIS ATTORNEY

United States Patent Office 3,221,502
Patented Dec. 7, 1965

3,221,502
FLOW CONTROL MASTER CYLINDER
Ronald L. Shellhause, Vandalia, Ohio, assignor to General Motors Corporation, Detroit, Mich., a corporation of Delaware
Filed Mar. 23, 1964, Ser. No. 353,883
10 Claims. (Cl. 60—54.6)

This invention relates to hydraulic master cylinders and more particularly to a flow operated, compensating device for clutch and brake master cylinders.

Hydraulic master cylinders generally found in use are satisfactory in operation only to a certain extent. One of the basic problems associated with hydraulic cylinders in use is the requirement for compensating ports located between a fluid reservoir and a power piston area. These compensating ports serve to draw hydraulic fluid from a reservoir when the power piston is withdrawn toward a position of rest if there is a shortage of fluid in the hydraulic system. In order to bring about this method of compensation, there is a requirement for extra parts in the master cylinder, the size of the master cylinder is larger than is desirable, and construction of these master cylinders involves a series of close tolerance requirements which can cumulatively lead to excessive dimensions in key areas.

It is an object of the present invention to provide an improved master cylinder having a flow operated, compensating device that has utility in clutch and brake applications.

It is another object of the present invention to provide an improved master cylinder that has a lesser overall length than master cylinders in common use.

It is still another object of the present invention to provide an improved master cylinder wherein the need for a secondary piston seal is eliminated.

It is still another object of the present invention to provide an improved master cylinder so constructed as to make possible elimination of push rod adjustment and the shimming of power brake units due to the stack-up of dimensional tolerances.

It is yet another object of the present invention to provide an improved master cylinder which allows elimination of a small by-pass hole normally located near the primary cup and the consequent cup damage as it passes over this hole under slight hydraulic pressures.

It is a further object of the present invention to provide an improved master cylinder so constructed as to allow the use of cylinder pistons having superior corrosion and wear resistance.

It is still a further object of the present invention to provide an improved master cylinder which makes possible the use of wheel cylinder cups as the only sliding seal in a master cylinder.

An additional object of the present invention is to provide an elastomeric fluid reservoir wall for a master cylinder which attaches to the master cylinder body so as to utilize a portion of the body as a reservoir wall.

A related object of the present invention is to provide such an elastomeric reservoir wall which is capable of being refilled by injection, and has sufficient tension to maintain a pressure on fluid in the reservoir as the fluid is stored and removed from the reservoir.

Further objects and advantages of the present invention will be apparent from the following description, reference being had to the accompanying drawings wherein preferred embodiments of the present invention are clearly shown.

Figure 1:
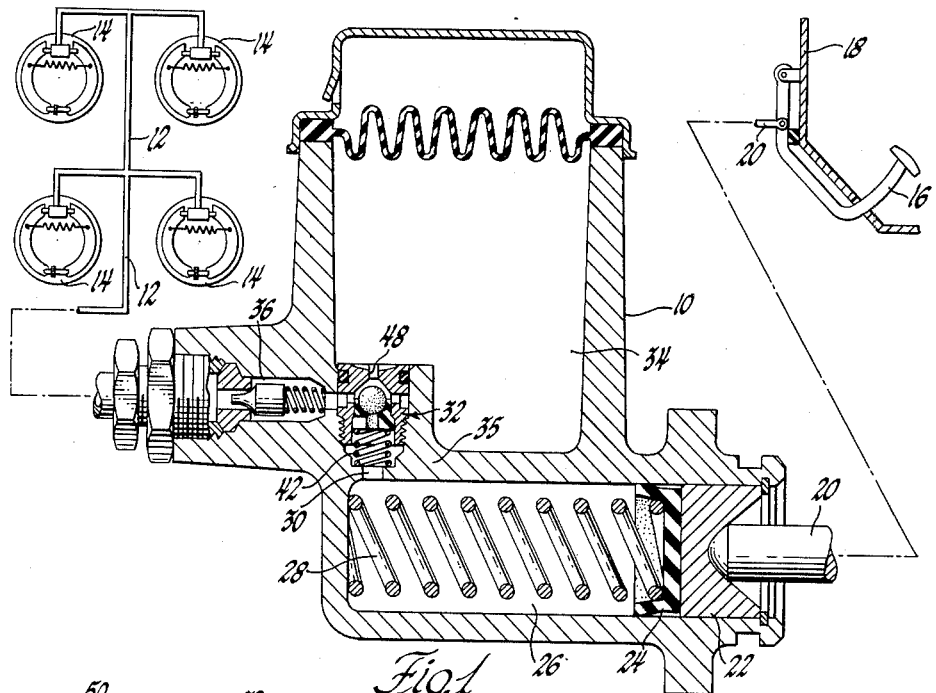
FIGURE 1 is a sectional view of the subject device; the device is shown in a diagrammatic representation of a vehicle braking system.

Referring now to FIGURE 1, an hydraulic master cylinder 10 is shown in an operative location in a braking system for a vehicle comprising hydraulic lines 12 leading to wheel brakes 14 and energized by a brake pedal 16 located in the driving compartment of the vehicle and extending through a fire wall 18.

A push rod 20 is pivotally attached to a portion of the suspended brake pedal 16 and is arranged to drive a piston 22 and a primary cup 24 into a pressure chamber 26 against the force of a spring 28.

An aperture 30 provides a communicating port between the pressure chamber 26 and the compensating valve or second means, generally designated by the numeral 32. The valve 32 provides a path for fluid flow between the pressure chamber 26 and a reservoir 34. The valve 32 also provides a path for fluid flow or pressure response between the pressure chamber 26 and the vehicle brakes 14 through a residual pressure valve 36. The residual pressure valve 36 is of common design and is constructed to maintain a residual pressure in the lines 12 to the wheel brakes 14 in an amount approximating 8 to 15 p.s.i. The series of communicating ports and passages in which the compensating valve 32 is disposed is sometimes referred to herein as a first means for directing fluid pressure to the fluid operable system or brake system as described herein.

Figure 2:
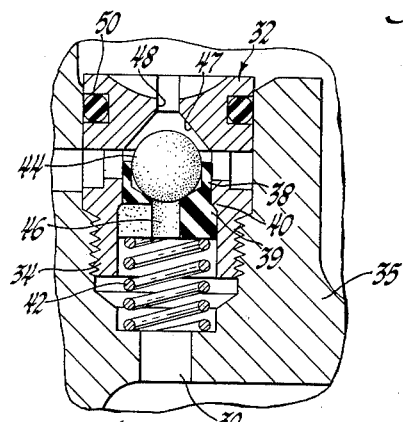
FIGURE 2 is an enlarged partial sectional view of the flow compensating mechanism shown in FIGURE 1.

Referring now to FIGURE 2, the valve 32 is illustrated in an enlarged sectional view. The valve assembly 32 is threaded into a wall 35 of the master cylinder 10. An elastomeric sleeve or ball guide 38 has an outwardly projecting flange 39 disposed about its outer periphery and held in firm engagement with a flange 40 formed on the inside periphery of the valve 32 by a spring 42. A ball 44, preferably of an elastomeric material, is disposed wtihin the sleeve 38 and is arranged to seal off a passage 46 in the center of the sleeve 38. The ball can be of any durometer rating but, in an application of a braking system for a vehicle, a durometer rating of 70–90 is preferred. The pressures developed in a system will dictate the exact durometer rating to be used. When under pressure, the ball 44 is driven upwardly against an underside surface 47 of the valve 32 to seal off a passage 48 leading into the reservoir 34. An O-ring 50 is circumferentially disposed on the periphery of the valve 32 and is adapted to seal the juncture of the valve 32 and the wall 35 against the casual passage of hydraulic fluid in this area.

In operation, the configuration of parts in the master cylinder is as illustrated in FIGURE 1. As the brake pedal 16 is depressed, the push rod 20 is driven toward the pressure chamber 26 and the piston 22, carrying the primary cup 24, is likewise moved to the left as viewed in FIGURE 1. The spring 28 is depressed and the fluid pressure developed in chamber 26 is felt in the valve 32 immediately. The ball 44, being of a specific gravity close to that of the fluid, approximately 101% to 125% thereof, is caused to rise immediately and seal the passage 48 to the reservoir 34 against the passage of fluid. The residual pressure valve 36 is adapted to pass the developed pressure immediately through its end on into the brake lines 12. In this manner, the wheel brakes 14 are energized.

When pressure is relieved from the brake pedal 16 and the push rod 20, the spring 28 will push the piston 22 to a position as shown in FIGURE 1. As the piston 22 moves to the right as viewed in this figure, a negative pressure is created in the chamber 26 and, as the piston 22 nears its seat, the ball 44 will be seated against the ball guide 38. During a normal return of the piston 22, the pressure chamber 26 will be substantially filled with hydraulic fluid before the ball 44 becomes seated. However, in a very rapid return of the piston, a vacuum or negative pressure is usually present in the pressure chamber 26. This negative pressure is depleted by a flow of fluid from the reservoir forcing the ball into the ball guide and then traveling around the outer edge of the ball guide as it is driven off its seat against the resistance of a spring 42 by the pressure of the fluid. This path for fluid flow is more clearly shown in FIGURE 2. During a slow flow return from the brake lines and after the depletion of the negative pressure in the pressure chamber, the fluid travels over the top of the ball and into the reservoir.

Figure 3:
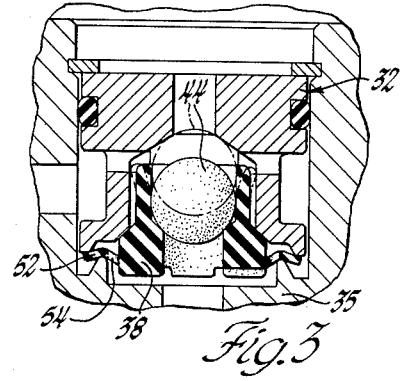
FIGURE 3 is a sectional view of another embodiment of the flow control mechanism shown in FIGURE 1.

Referring now to FIGURE 3, another embodiment of the valve 32 is shown wherein an outwardly disposed flange 52 of the sleeve is held between the wall 35 and the valve 32. A series of apertures 54 in the flange 52 permit the passage of fluid from the brake lines to the pressure chamber during a rapid return of the piston 22 as the negative pressure pushes the sleeve 38 from its seat.

Figure 4:
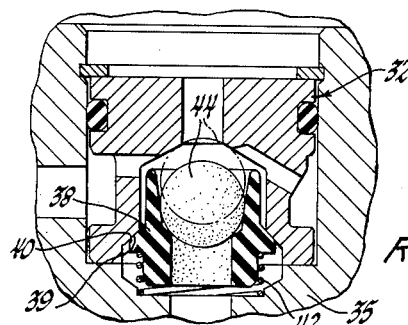
FIGURE 4 is still another embodiment of the flow control mechanism shown in FIGURE 1.

Referring now to FIGURE 4, another embodiment of the present invention is illustrated wherein the upper portion of the sleeve 38, providing the seat for the ball 44, is more freely deformable and more readily permits the passage of fluid past the periphery of the sleeve 38 on return. In this embodiment, the spring 42 fits around a portion of the sleeve and maintains the valve sleeve 38 in firm engagement with the seat 40.

Figure 5:
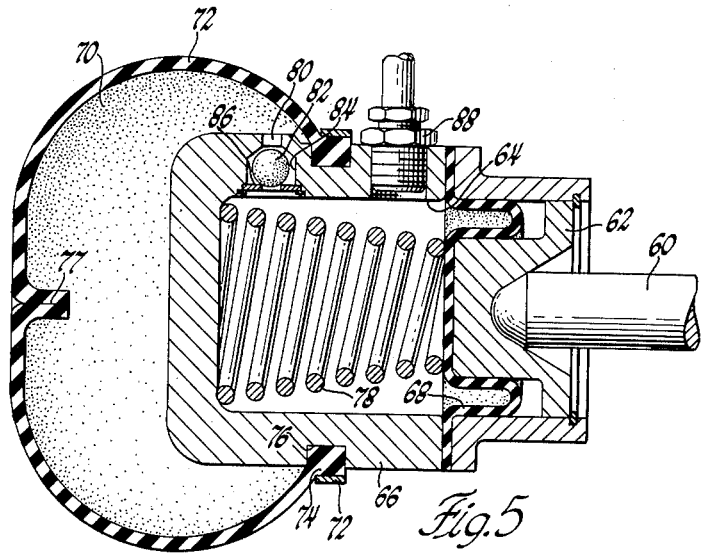
FIGURE 5 is a sectional view of another embodiment of the master cylinder shown in FIGURE 1, this embodiment having particular utility in a clutch installation.

Referring now to FIGURE 5, another type of master cylinder is shown wherein a push rod 60 engages a piston 62 which is adapted to slide in a bore 64 of a master cylinder body 66. The bore 64 is kept fluid-tight by a resilient boot or diaphragm 68 which folds back over the piston and allows a certain amount of translational movement of the piston in the direction of a reservoir 70. The reservoir 70 is formed by an elastomeric member 72 which is maintained under pressure and is kept in contact with the master cylinder body 66 by the cooperation of a rib 74 and a groove 76. The member 72 is secured to the body 66 by a suitable clamping member 75 fitting over rib 74. Fluid may be replenished in the reservoir by injection through a needle fitting in the reservoir valve 77. The piston 62 is biased toward the right, as viewed in FIGURE 5, by a return spring 78. An aperture 80 through the master cylinder body 66 provides a path for fluid flow from the bore 64 to the reservoir 70. A ball check valve 82 is disposed in the aperture 84 in a wall of the master cylinder body and is held by virtue of its own weight and the pressure in the reservoir 70 against a seat 86. As mounted, the ball 82, resting on the seat 86, allows the free passage of fluid past the ball from the reservoir 70 into the bore 64.

In operation, pressure is exerted against push rod 60 in any well-known manner. The push rod 60 can be hooked up to a pedal, substantially as described in FIGURE 1, but could be operated in other ways. The push rod 60 engaging the piston 62 causes the piston to move leftwardly against the force of the spring 78 and the ball 82 is driven into engagement with the periphery of the aperture 80 in the wall of the master cylinder body 66. Thereafter, any displacement of fluid causes a pressure to be felt at the outlet 88 alone. The outlet 88 could be in fluid engagement with any fluid operable device, for example, a clutch. As pressure seats the ball 82 blocking the aperture 80, it is apparent that pressure will not flow or be felt in the reservoir 70.

As the pressure against the push rod 60 is released, the spring 78 will drive the piston 62 into a position as illustrated in FIGURE 5. This will create a negative pressure in the bore 64 and the ball 82 will fall against the seat 86. Pressure will be relieved in the system and fluid flow will be had through the outlet 88 back into the bore 64. As the pressure is relieved in the outlet 88, a fluid flow will result from the reservoir 70 past the ball 82 into the bore 64 area if there is a fluid need therein, as determined by the relative pressures. The reservoir 70, being slightly pressurized, thereby provides a ready source of fluid to the bore 64.

Figure 6:
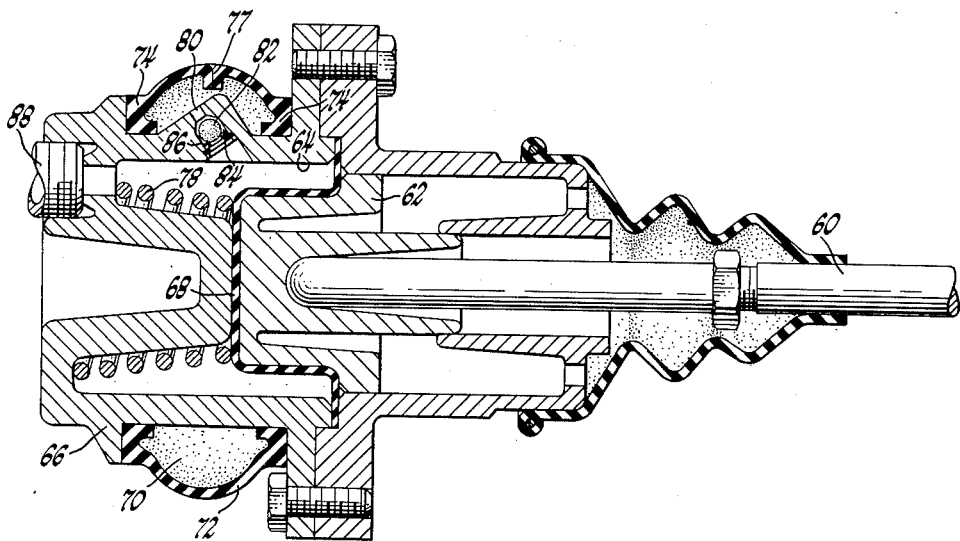
FIGURE 6 is another embodiment of the master cylinder illustrated in FIGURE 5.

Referring now to FIGURE 6, another embodiment of the subject invention is shown, similar to that illustrated in FIGURE 5 and the numbers applied to parts in FIGURE 5 will apply to the parts in FIGURE 6 although the configuration is slightly different. In this embodiment, the reservoir 70 is annular in shape and the annular elastomeric member 72, defining the outer reservoir wall, fits in between retaining portions on the outside wall of the master cylinder body 66. The ribs 74 hold the member 72 in sealing relation to body 66, and are aided by the pressure of fluid within the reservoir.

In operation, the push rod 60 is driven in the direction of the piston 62, causing the piston 62 to be driven into a position substantially as viewed in FIGURE 6. Fluid will be displaced from the bore 64 and the pressure will be immediately sensed by the ball 82 which will be driven into sealing engagement with the aperture 80. Pressure will also be felt at the outlet 88 which would be attached to any common fluid operable device, such as a clutch.

When the pressure is released from the push rod 60, the pressure return through the outlet 88 will cause fluid to fill the bore 64 which will become enlarged from that viewed in FIGURE 6 due to the repositioning of the piston 62 to the poised position at the far right in the bore. At the same time, the ball 82 will fall to its seat 86 and there will be an equalization of pressure between the reservoir 70, the bore 64 and the fluid operable device attached to the outlet 88. It is therefore readily seen that the bore 64 will be constantly supplied with fluid from the reservoir 70 in the event that any fluid is lost through normal leakage in the fluid pressure system.

It should be noted that the operation of the device depends upon maximum sensitivity to flow work energy. The ball, while not buoyant in brake fluid or in normal hydraulic fluid to be used in a system, has a low specific gravity, causing the fluid to support approximately 85% of the mass of the ball. The annular orifice formed around the ball by the guide is controlled to obtain maximum fluid velocities to lift the ball with very little input flow.

The utility of the modifications illustrated in FIGURES 2, 3 and 4 is obvious in an application where the ball is used as a compensating port in a master cylinder for vehicle brakes. It is common in the prior art to have compensating ports located in the periphery of the main piston bore which causes the problem of piston cup tearing as the rubber or elastomeric member passes over the compensating ports. The compensating ports are no longer necessary with the compensating ball as described in these embodiments.

The configuration of the master cylinder illustrated in FIGURE 1 is a typical variety that would be employed when there is a need to retain a certain amount of residual pressure in the output lines. It is understood that the particular valving arrangement could be altered to suit a given installation.

The modifications illustrated in FIGURES 5 and 6 are particularly suited for use in clutch mechanisms. In this type installation, there would be no need for residual pressure and the elastomeric walled reservoir would be filled with hydraulic fluid and adapted to keep the bore 64 filled with hydraulic fluid and, therefore, very responsive to movement of the push rod. The adaptability of the ball to control flow between a reservoir and an operative piston varies greatly and the exact configuration of the ball and valving arrangement will depend a great deal on the pressure of the system to be served as well as the type of the fluid operable device to be operated.

While the embodiments of the present invention, as herein disclosed, constitute preferred forms, it is to be understood that other forms might be adopted.

What is claimed is as follows:

1. A master cyclinder for fluid pressure producing apparatus, said master cylinder comprising: fluid storage means, fluid displacing means in fluid communication with said fluid storage means and adapted to draw fluid therefrom, first means for directing fluid pressure from the fluid displacing means to a fluid operable system, and valve means disposed within said first means and including an unrestrained displaceable element therein adapted to selectively isolate the fluid storage means from the fluid pressure producing apparatus and bring said fluid pressure producing apparatus into fluid communication with said fluid operable system during periods of pressure development, said valve means arranged to pass fluid from the fluid storage means into the fluid pressure producing apparatus as the fluid quantity therein becomes depleted in response to a negative pressure in said fluid displacing means, said valve means arranged to shut off fluid flow from said fluid storage means to the fluid displacing means as the need therein is satisfied.

2. A master cylinder for a vehicle braking system including fluid operable means, said master cylinder comprising: a fluid reservoir having an outlet into the braking system; piston means reciprocable in the master cylinder and juxtaposed to said reservoir; said piston means adapted to develop fluid pressure in the vehicle braking system; conduit means interposed between said reservoir, said piston means and the vehicle braking system for transferring fluid therebetween; and valve means including a displaceable element, said displaceable element disposed in said conduit means and adapted to selectively isolate the reservoir from the braking system and bringing said master cylinder into fluid communication with the braking system, said valve means having means for passing fluid from said fluid reservoir into the fluid displacing means in response to a negative pressure created by the fluid displacing means returning to a position of rest after an actuation.

3. A master cylinder for a vehicle braking system including fluid operable means, said master cylinder comprising: a fluid reservoir having an outlet into the braking system; piston means reciprocable in the master cylinder and juxtaposed to said reservoir; said piston means adapted to develop fluid pressure in the vehicle braking system; conduit means interposed between said reservoir, said piston means and the vehicle braking system for transferring fluid therebetween; and valve means arranged to be seated against one end of the conduit means by holding means for preventing fluid passage thereby; said valve means including an elastomeric sleeve portion and a displaceable element adapted for translational movement therein to selectively seal the outlet from the reservoir into the braking system at one extreme of translational movement in response to a pressure producing movement of the piston means, and to seal one end of the sleeve portion against fluid flow therethrough at another extreme of translational movement in response to a pressure reducing movement of the piston means.

4. A master cylinder of the type described in claim 3 wherein the holding means is a spring biasing the sleeve portion against a flange in the conduit means, said sleeve being movable from said flange during periods of negative pressurization to pass fluid from said reservoir to said piston means.

5. A master cylinder of the type described in claim 3 wherein the holding means is a spring biasing a peripheral flange of the sleeve portion against a flange in the conduit means.

6. A master cylinder of the type described in claim 3 wherein the holding means is a peripherally disposed rib integral to the elastomeric sleeve portion serving as a return means, said rib being held between assembled portions of the conduit means and including apertures therein to allow fluid flow therethrough.

7. A master cylinder of the type described in claim 3 wherein the elastomeric sleeve portion includes a flange disposed on the inside periphery of the sleeve, and the displaceable element is a ball adapted to seal against the flange of the sleeve portion.

8. A master cylinder of the type described in claim 3 wherein the elastomeric sleeve portion includes a flange disposed on the inside periphery of the sleeve portion, and the displaceable element is an elastomeric ball adapted to seal against the flange of the sleeve portion.

9. A master cylinder of the type described in claim 3 wherein the elastomeric sleeve portion includes a flange disposed on the inside periphery of the sleeve portion, and the displaceable element is an elastomeric ball adapted to seal against the flange of the sleeve portion, said elastomeric ball having a durometer rating within a 70–90 durometer range.

10. A master cylinder of the type described in claim 3 wherein the holding means is a peripherally disposed rib integral to the elastomeric sleeve portion, said rib being held between assembled portions of the conduit means, and the displaceable element is a ball having a specific gravity no more than 125% of the specific gravity of the fluid in the braking system.

References Cited by the Examiner

UNITED STATES PATENTS

| 1,945,728 | 2/1934 | Brush | 60—54.6 |
| 2,000,187 | 5/1935 | Oliver | 60—54.6 |
| 2,114,992 | 4/1938 | Bowen | 60—54.6 |
| 2,283,695 | 5/1942 | Pratt et al. | 60—54.6 X |

FOREIGN PATENTS 1,152,415 9/1957 France.

SAMUEL LEVINE, Primary Examiner.

EDGAR W. GEOGHEGAN, Examiner.